US010372638B2

(12) United States Patent
McGee

(10) Patent No.: US 10,372,638 B2
(45) Date of Patent: Aug. 6, 2019

(54) INTERCONNECT AGENT

(71) Applicant: Hewlett Packard Enterprise Development LP, Houston, TX (US)

(72) Inventor: Thomas E. McGee, Chippewa Falls, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/789,105

(22) Filed: Oct. 20, 2017

(65) Prior Publication Data
US 2019/0121762 A1 Apr. 25, 2019

(51) Int. Cl.
G06F 13/36 (2006.01)
G06F 12/0815 (2016.01)

(52) U.S. Cl.
CPC .......... *G06F 13/36* (2013.01); *G06F 12/0815* (2013.01); *G06F 2212/2542* (2013.01)

(58) Field of Classification Search
CPC ................. G06F 13/36; G06F 12/0815; G06F 2212/2542
See application file for complete search history.

(56) References Cited

U.S. PATENT DOCUMENTS

| 6,012,127 | A | * | 1/2000 | McDonald | .......... | G06F 12/0817 |
| | | | | | | 711/141 |
| 6,108,764 | A | | 8/2000 | Baumgartner et al. | | |
| 7,613,885 | B2 | | 11/2009 | Uehara et al. | | |
| 8,898,393 | B2 | | 11/2014 | Chinthamani et al. | | |
| 9,619,303 | B2 | | 4/2017 | Ray et al. | | |
| 2003/0009432 | A1 | * | 1/2003 | Sugahara | .............. | G06F 13/387 |
| 2008/0147988 | A1 | | 6/2008 | Heller et al. | | |
| 2009/0319634 | A1 | * | 12/2009 | Tanaka | .................... | G06F 15/16 |
| | | | | | | 709/212 |
| 2011/0238909 | A1 | * | 9/2011 | Kumar | ................. | G06F 12/0866 |
| | | | | | | 711/114 |
| 2015/0026380 | A1 | * | 1/2015 | Egi | ...................... | G06F 13/4282 |
| | | | | | | 710/308 |
| 2016/0092123 | A1 | * | 3/2016 | Kumar | .................. | G06F 3/0617 |
| | | | | | | 711/118 |

OTHER PUBLICATIONS

Iyer, R. et al., "Switch Cache: A Framework for Improving the Remote Memory Access Latency of CC-NUMA Multiprocessors," (Research Paper), 1999, 9 pages.

* cited by examiner

*Primary Examiner* — Glenn A. Auve
(74) *Attorney, Agent, or Firm* — Hewlett Packard Enterprise Patent Department

(57) ABSTRACT

A method for modifying an address in a multi-processor system may include performing a first transaction to modify an address between a first processor and an interconnect agent associated with the first processor and storing data for the address on the interconnect agent. The method may further include performing a second transaction to modify an address between the interconnect agent and a memory associated with a second processor and storing the data in the memory.

18 Claims, 4 Drawing Sheets

INTERCONNECT AGENT

BACKGROUND

A multi-processor system can include multiple processors that can be associated with respective local memories. The multi-processor system can be arranged as a cache-coherent non-uniform memory access (ccNUMA) system in which a processor can remotely access a memory associated with another processor.

BRIEF DESCRIPTION OF THE DRAWINGS

Various examples will be described below by referring to the following figures.

Figure 1:
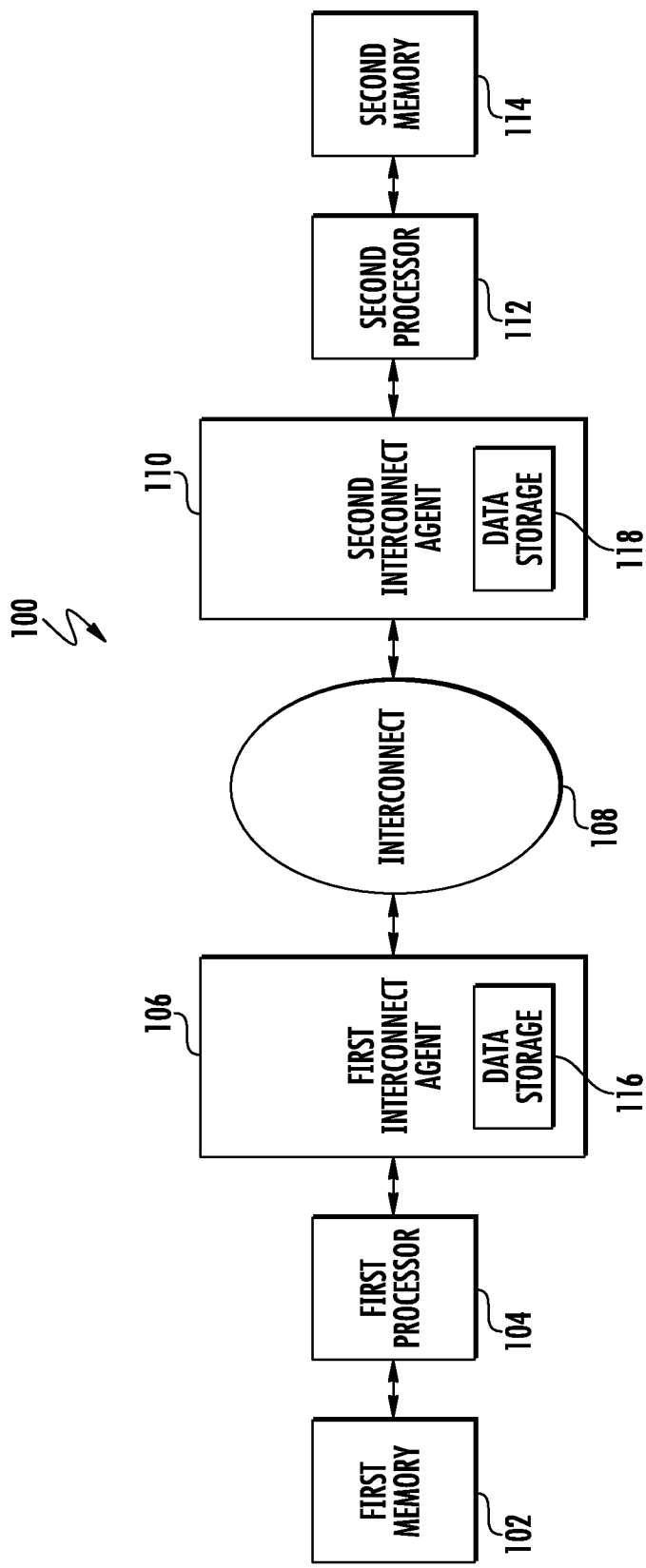
FIG. 1 is a block diagram of an example multi-processor system.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

When a processor in a ccNUMA system has to access a memory that is not connected locally, additional latency may impact the performance of the system. For example, the time it takes a processor to access a remote memory is greater than the time it takes for the processor to access its local memory. The number of traversals of the interconnect network between the processor and the remote memory needed to modify the contents of an address in a remote memory adds latency when compared to the time required for the processor to access the local memory to modify the contents of an address in the local memory.

A non-temporal store is a method that may be used to reduce the latency for a processor accessing a remote memory for an operation such as a write transaction. In a non-temporal store, when a remote processor grants exclusive rights to a requesting processor to access an address, the remote processor does not send the current contents of the address under the assumption that the requesting processor will over write the contents of the address. A non-temporal store reduces latency by not reading the memory and reduces bandwidth of the transmission by not transmitting all of the data from the address with the message granting access to the requesting processor. There is still, however, some latency associated with access of a remote memory using a non-temporal store to access a remote memory when compared to the time to access a local memory.

The latency of certain computer transactions in a multi-processor system (e.g., a ccNUMA system) may be reduced by reducing the number of times messages or transactions fully traverse the interconnect network connecting processors. A temporary local coherence domain for an address or addresses may be created on an interconnect agent and the interconnect agent may be used to perform operations to reduce the latency of a non-temporal store.

A method for modifying an address in a multi-processor system may comprise performing a first transaction to modify an address between a first processor and an interconnect agent associated with the first processor and storing data for the address on the interconnect agent. The method may further comprise performing a second transaction to modify an address between the interconnect agent and a memory associated with a second processor and storing the data in the memory.

An interconnect agent may comprise data storage and logic to detect a request for ownership sent from a first processor to a second processor. The request for ownership is associated with an address. The logic may further apply a coherence protocol to the address, transmit a grant of ownership to the first processor and receive a write message from the first processor. The write message may comprise data for the address. The logic may further transmit an acknowledgement to the first processor and store the data in the data storage.

A system may comprise a first processor and an interconnect agent coupled to the first processor. The interconnect agent may comprise data storage. The system may further comprise an interconnect network coupled to the interconnect agent, a second processor coupled to the interconnect network and a memory coupled to the second processor. The interconnect agent may be designed to detect a request for ownership sent from the first processor to the second processor. The request for ownership is associated with an address. The interconnect agent may be further designed to transmit a grant of ownership to the first processor, receive a write message from the first processor and transmit an acknowledgement to the first processor. The write message may comprise data for the address.

FIG. 1 is a block diagram of an example multi-processor system 100. A first processor 104 is in communication with and coupled to a first memory 102 and a first interconnect agent 106. A second processor 112 is in communication with and coupled to a second memory 114 and a second interconnect agent 110. The interconnect agents 106, 110 are interconnected to each other over an interconnect (or interconnect network) 108 (including buses and links). FIG. 1 shows two processors; however, it should be understood that in other examples the multiprocessor system 100 may comprise different numbers of processors and a respective memory and interconnect agent for each processor.

The first processor 104 may remotely access the second memory 114 associated with the second processor 112 and the second processor 112 may remotely access the first memory 102 associated with the first processor 104. For example, the first processor 104 can issue a transaction to the second memory 114 to modify an address in the second memory 114. First memory 102 and second memory 114 may be a storage device or a collection of storage devices which can comprise integrated circuit or semiconductor memory device(s) or other types of storage devices. In one example, a transaction issued by the first processor 104 passes through the first interconnect agent 106, over the interconnect 108, through the second interconnect agent 110 and through the second processor 112 to the second memory 114.

The first interconnect agent 106 comprises data storage 116 and logic that allows the interconnect agent to perform tasks and operations related to a transaction between processors 104 and 112. The second interconnect agent 110 comprises data storage 118 and logic that allows the interconnect agent to perform tasks and operations related to transactions between processors 104 and 112. Although the interconnect agents 106, 110 are depicted as being separate from their respective processors 104, 112, in difference examples, an interconnect agent can be integrated into the associated processor. Thus, an interconnect agent can refer to a controller that is outside of the associated processor or integrated into the associated processor. In examples where the interconnect agent is separate from the respective processor, the interconnect agent can be implemented as an application specific integrated circuit (ASIC) device or other type of control chip.

Figure 2:
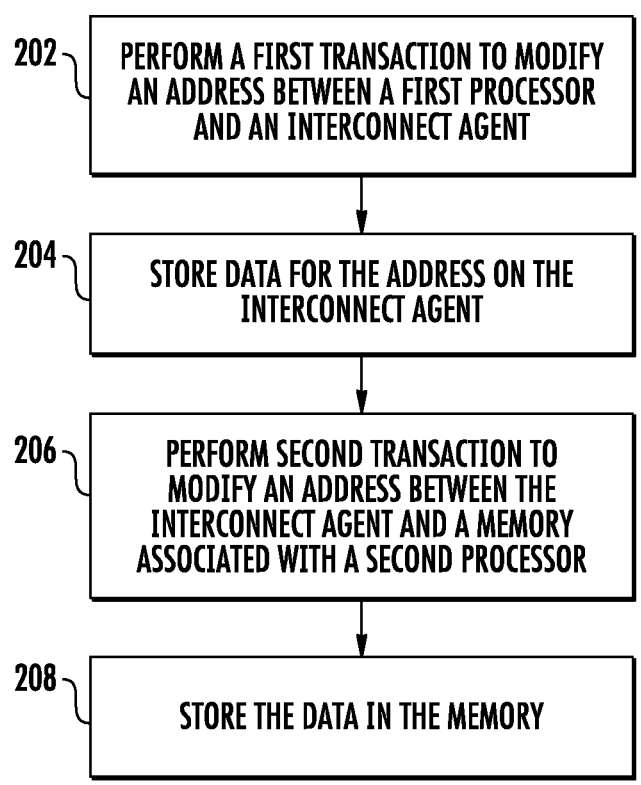
FIG. 2 is an example flowchart of a method for modifying an address in a multi-processor system
Figure 3:
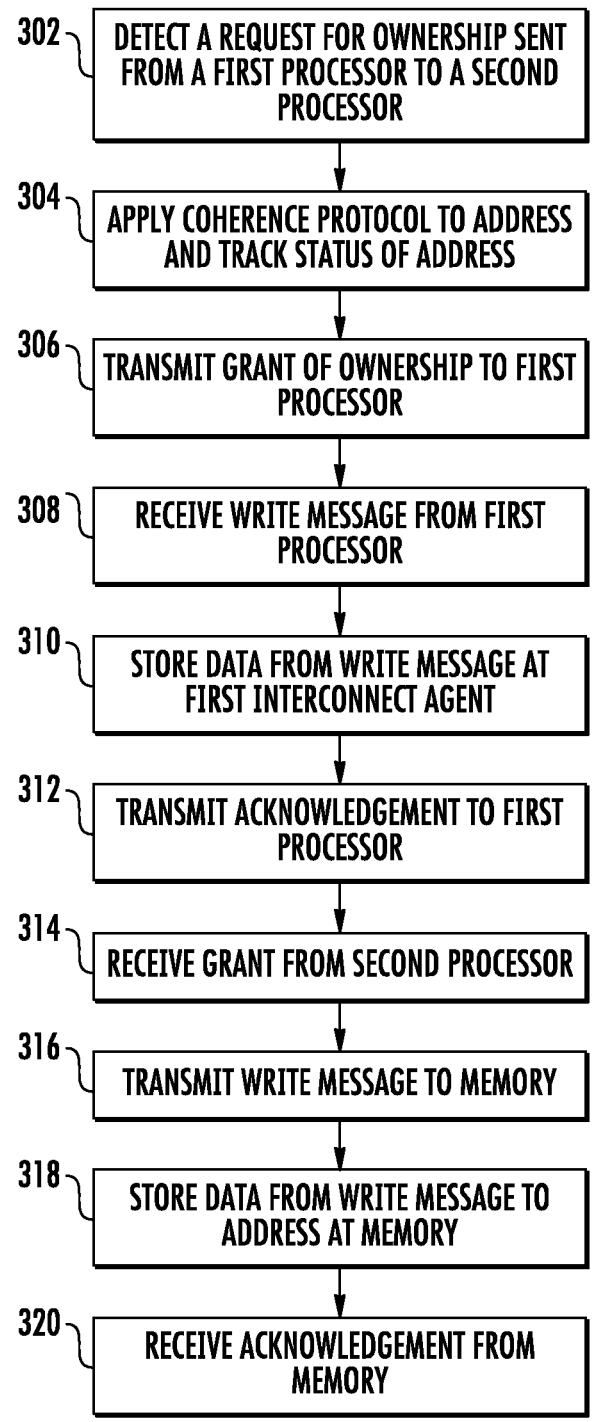
FIG. 3 is an example flowchart of a method for modifying an address in a multi-processor system.
Figure 4:
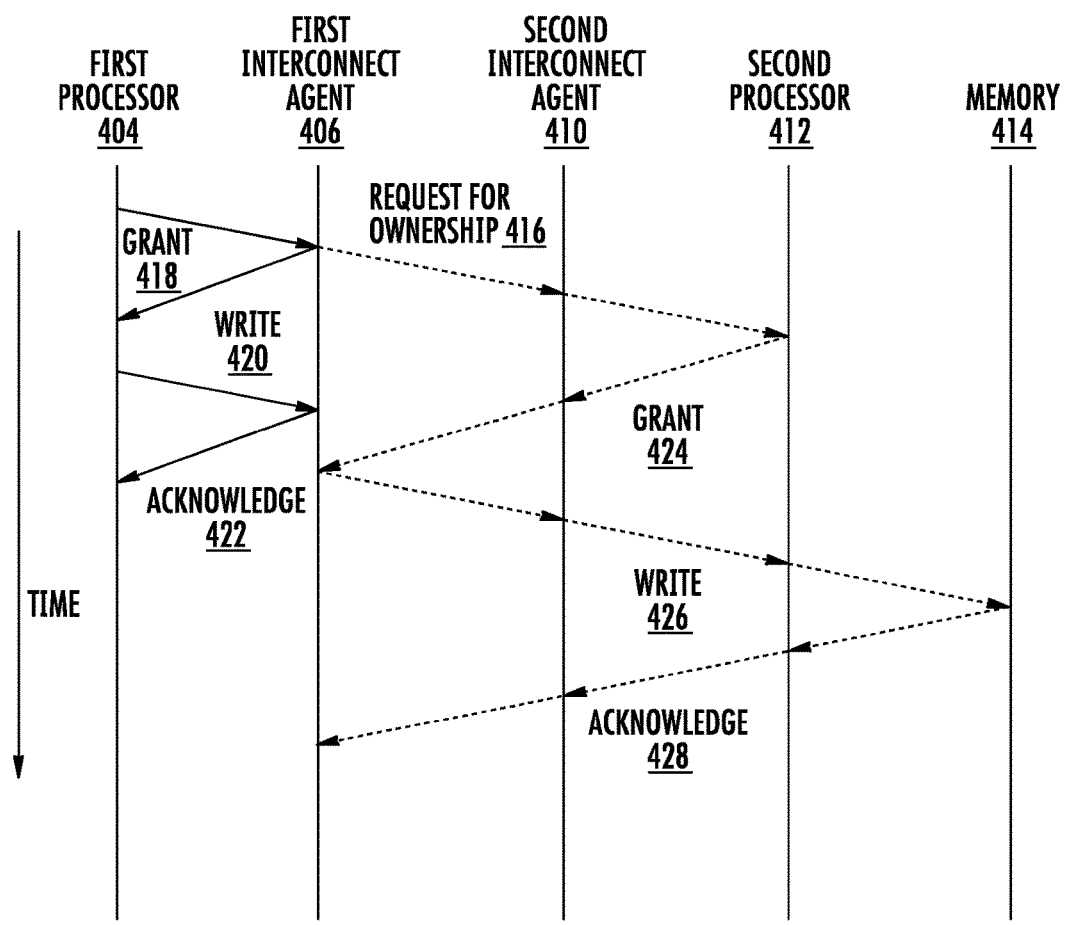
FIG. 4 is a store ladder diagram of an example method for modifying an address in a multi-processor system.

The first interconnect agent 106 and the second interconnect agent 110 comprise logic to perform tasks or operations to reduce the latency of a transaction by their respective processor to modify an address of a remote memory. FIGS. 2-4 illustrate examples of methods for modifying an address. The examples discussed below with respect to FIGS. 2-4 will refer to the first interconnect agent 106 and a transaction initiated by the first processor 104, however, it should be understood that each interconnect agent in a multi-processor system (e.g., second interconnect agent 110) may be used to implement similar tasks and operations for transactions initiated by their respective processor (e.g., processor 112).

FIG. 2 is an example flowchart of a method for modifying an address in a multi-processor system. An interconnect agent that is associated with a processor may be used to reduce the latencies seen by the processor for a transaction (e.g., a write transaction) with a remote memory. At block 202, a first transaction to modify an address is performed between a first processor and an interconnect agent. At block 204, data for the address is stored on the interconnect agent (e.g., in data storage). At block 206, a second transaction to modify an address is performed between the interconnect agent and a memory associated with a second processor. At block 208, data for the address is stored in the memory. In accordance with this example, the interconnect agent acts as a proxy for the memory. In addition, the interconnect agent acts as a proxy for the first processor while updating the contents of the memory.

Referring to FIGS. 3 and 4, another example of a method for modifying an address in a multi-processor system is shown. At block 302, an interconnect agent 406 associated with a first processor 404 detects a request for ownership 416 sent from the first processor 404 to a second processor 412. The request for ownership 416 is used to obtain exclusive ownership of an address. At block 304, the interconnect agent 406 applies a coherence protocol to the address to be modified to ensure coherence is maintained in the system and to determine if it is appropriate to accelerate the request for ownership 416 as described further below. In addition, the interconnect agent 406 will allocate a resource to track the state of the address.

At block 306, if the coherence protocols are met the interconnect agent 406 transmits a grant of ownership 418 to the first processor 404. The grant of ownership 418 provides an earlier response to the first processor 404 than if, for example, the processor 404 had to wait for a response from the memory 414. If the coherence protocols are not met, the interconnect agent will not accelerate the request for ownership 416 by providing a grant of ownership 418 to the first processor 404. For example, if the address is being snooped by the memory 414, the interconnect agent 406 will not send a grant of ownership 418 for the address to the first processor 404. If the memory 414 attempts to snoop the first processor 404, the interconnect agent 406 may follow the coherence protocol to resolve the conflict by snooping the first processor 404.

The interconnect agent 406 creates a temporary local coherence domain for the address and treats the address on processor A as being separate from the other processors in the system. The interconnect agent 406 also maintains a coherence domain for the address for the remaining processors in the system (e.g., second processor 412). The local coherence domain is located on the interconnect agent 406 and is separate from the coherence domain for the address for the remaining processors in the system. The interconnect agent 406 maintains the local coherence domain for the address for the first processor and the separate coherence domain for the remaining processors in the system to avoid protocol deadlocks and data corruption.

At block 308, the interconnect agent 406 receives a write message 420 from the first processor 404 that comprises the data for the address. At block 310, the data from the write message 420 is stored on the interconnect agent 406 (e.g., in data storage 116 shown in FIG. 1). At block 312, the interconnect agent 406 transmits an acknowledgement 422 to the first processor 404 to acknowledge an update of the address on the interconnect agent 406. While the transaction between the first processor 404 and the interconnect agent 406 is being completed, the request for ownership 416 is transmitted to the second processor 412 through the interconnect network 108 (shown in FIG. 1) and the second interconnect agent 410. The first processor 404 is able to proceed with its processing for the transaction while the first interconnect agent 406 waits for a grant of ownership from the second processor 412. When the transaction between the first processor 404 and the interconnect agent 406 is complete, the processor 404 is available for other operations or tasks. If the first processor issues a subsequent read request for the address while the resource on the interconnect agent 406 is active, the read request may be held until a grant of ownership 424 from the second processor 412 or an acknowledgement 428 from the memory 414 is returned to the interconnect agent 406.

At block 314, the interconnect agent receives a grant of ownership 424 from the second processor 412 if, for example, the coherence protocols are met. At bock 316, the interconnect agent 406 transmits a write message 426 to the memory 414 associated with the second processor 412 that comprises the data for the address. At block 318 the data from the write message 426 is stored in memory 414. At block 320, the interconnect agent 406 receives an acknowledgement from the memory 414 to acknowledge an update of the address in the memory 414.

As mentioned above with respect to block 304, the interconnect agent 406 will allocate a resource to track the state of the address (e.g., the address of the request). The amount of time the resource remains active may be based on a set of conditions. In one example, the resource will remain active until the interconnect agent 406 receives a grant of ownership 424 from the second processor 412 if there was no write message 420 from the first processor 404. In another example, the resource will remain active until the interconnect agent 406 receives an acknowledgement 428 from the memory 414 if the first processor sent a write message 420 while the resource is active.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

I claim:

1. An interconnect agent comprising:
data storage; and
logic to:
detect a request for ownership sent from a first processor to a second processor, the request for ownership associated with an address;
apply a coherence protocol to the address;
transmit a grant of ownership to the first processor;
receive a write message from the first processor, the write message including data for the address;
transmit an acknowledgement to the first processor; and
store the data in the data storage.

2. The interconnect agent according to claim 1, further comprising logic to:
receive a grant of ownership from the second processor;
transmit a write message to a memory associated with the second processor, the write message including the data for the address; and
receive an acknowledgement from the memory.

3. The interconnect agent according to claim 1, further comprising logic to track a status of the address.

4. The interconnect agent according to claim 3, further comprising logic to maintain a local coherence domain for the first processor.

5. The interconnect agent according to claim 4, further comprising logic to maintain a coherence domain for the second processor.

6. A system comprising:
a first processor;
an interconnect agent coupled to the first processor, the interconnect agent having data storage;
an interconnect network coupled to the interconnect agent;
a second processor coupled to the interconnect network; and
a memory coupled to the second processor;
wherein the interconnect agent to:
detect a request for ownership sent from the first processor to the second processor, the request for ownership associated with an address;
transmit a grant of ownership to the first processor;
receive a write message from the first processor, the write message including data for the address;
transmit an acknowledgement to the first processor.

7. The system according to claim 6, wherein the interconnect agent is further to apply a coherence protocol to the address.

8. The system according to claim 6, wherein the interconnect agent is further to store the data in the data storage.

9. The system according to claim 6, wherein the interconnect agent is further to:
receive a grant of ownership from the second processor;
transmit a write message to the memory, the write message including the data for the address; and
receive an acknowledgement from the memory.

10. The system according to claim 9, wherein the second processor is to store the data in the memory.

11. The system according to claim 6, wherein the interconnect agent is further to track a status of the address.

12. A method comprising:
detecting, by an interconnect agent, a request for ownership sent from a first processor to a second processor, the request for ownership associated with an address;
transmitting, by the interconnect agent, a grant of ownership to the first processor;
receiving a write message from the first processor, the write message including data for the address; and
transmitting an acknowledgement to the first processor.

13. The method of claim 12, further comprising tracking a status of the address.

14. The method of claim 13, wherein the status of the address is tracked using a resource on the interconnect agent.

15. The method of claim 13, further comprising maintaining a local coherence domain for the first processor.

16. The method of claim 14, further comprising maintaining a coherence domain for the second processor.

17. The method of claim 12, further comprising applying a coherence protocol to the address.

18. The method of claim 12, further comprising storing the data in data storage.

* * * * *